(No Model.)

W. T. FRENCH.
FOLDING BICYCLE SUPPORT.

No. 547,345. Patented Oct. 1, 1895.

Witnesses.
Robert Everett.
Dennis Sumby.

Inventor:
Walter T. French.
By James L. Norris
Atty.

UNITED STATES PATENT OFFICE.

WALTER T. FRENCH, OF JACKSONVILLE, FLORIDA.

FOLDING BICYCLE-SUPPORT.

SPECIFICATION forming part of Letters Patent No. 547,345, dated October 1, 1895.

Application filed June 6, 1895. Serial No. 551,897. (No model.)

*To all whom it may concern:*

Be it known that I, WALTER T. FRENCH, a citizen of the United States, residing at Jacksonville, in the county of Duval and State of Florida, have invented new and useful Improvements in Folding Bicycle-Supports, of which the following is a specification.

This invention relates to folding bicycle-supports, and has for its chief object to provide a novel, simple, efficient, and economical device, which can be applied to any bicycle and be carried thereby, and which is provided with leg-pieces susceptible of being simultaneously raised or lowered in a vertical plane parallel or approximately parallel with the main rod or stem of the device, which is secured to the bicycle-frame, and of being locked either raised or lowered for the purpose of placing and holding the leg-pieces upright beside the rod or stem and out of the way while the bicycle is in use or against the floor or ground to support the bicycle in an upright position when it is not in use.

To accomplish this object my invention consists, essentially, in the combination of a main rod or stem having means at its upper end to engage a part of a bicycle-frame and a gear-supporting plate at its lower end, a pair of intermeshing rotatable gears arranged vertically on the said gear-supporting plate, a pair of leg-pieces having journals or spindles at their inner ends secured, respectively, to the gears and adapted to oscillate in a vertical plane approximately parallel with the rod or stem and to turn from a pendulous to an upright position beside the rod or stem, a finger-lever mounted on one of the leg-pieces and having a locking-pin, and a plate having orifices to receive the locking-pin for locking the leg-pieces when turned up or down.

The invention also consists in certain features of construction and arrangement or combination of parts hereinafter described and claimed, reference being made to the accompanying drawings, in which—

Figure 1:
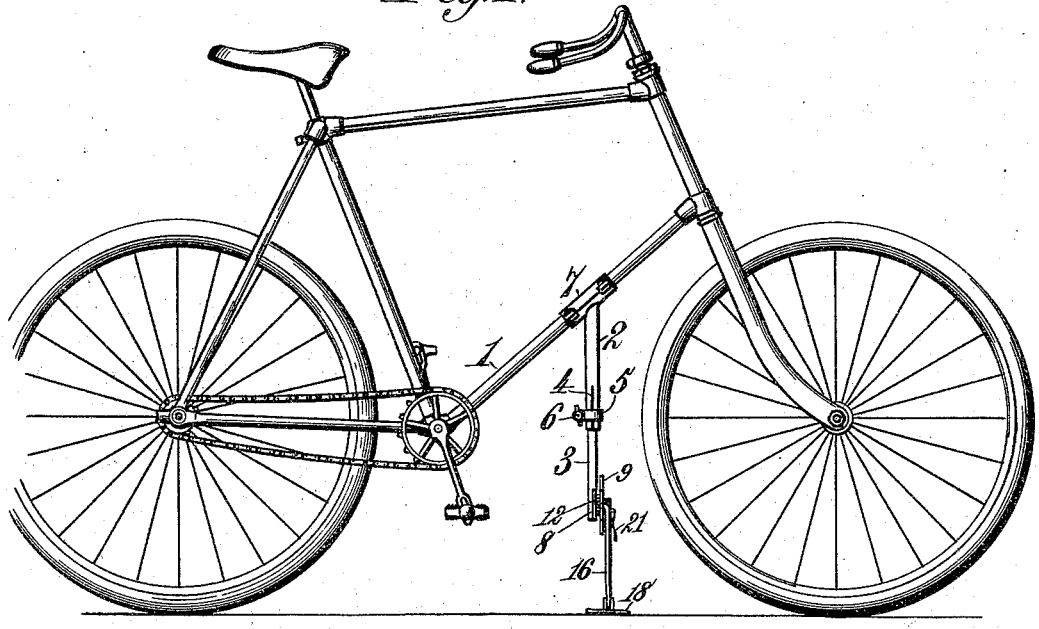
Figure 2:
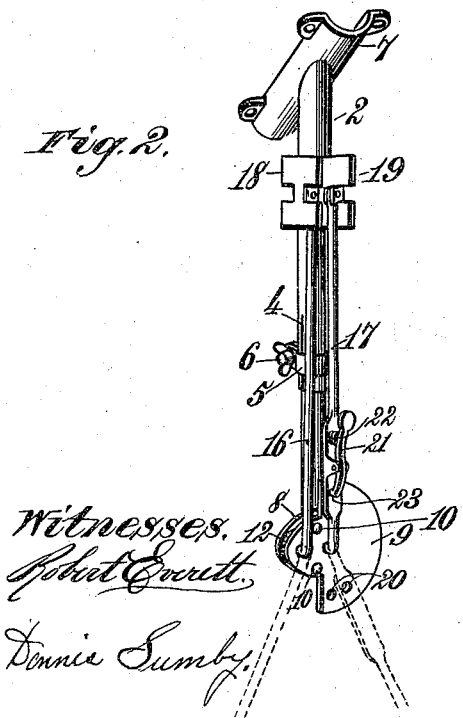
Figure 3:
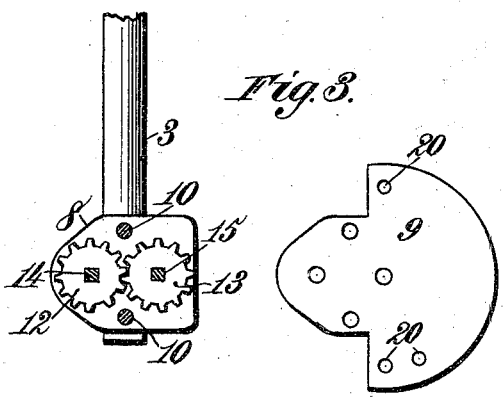

Figure 1 is a perspective view of a bicycle with my improved support applied thereto and adjusted to support the bicycle in an upright position. Fig. 2 is a detail perspective view of the improved support, showing the leg-pieces turned up beside the main rod or stem; and Fig. 3 is a view of the plates and gear-wheels, the locking-plate being separated from the gears to more clearly show the latter.

In order to enable those skilled in the art to make and use my invention, I will now describe the same in detail, referring to the drawings, wherein—

The numeral 1 indicates the frame of a bicycle, which, as here shown, is of the ordinary diamond-shaped frame, but which may be of any known construction.

The main rod or stem of the improved bicycle-support comprises two telescopic cylindrical sections 2 and 3. The section 2 is tubular and is slit at its lower end, as at 4, and the other section 3 is adapted to be adjusted lengthwise in the section 2, and held in a fixed position after adjustment through the medium of a clamp composed of a surrounding band 5 and clamping-screw 6. The upper end of the rod or stem section 2 is provided with a clamp 7, by which the rod or stem can be detachably clamped to the bicycle-frame 1.

The bicycle-support is designed to be carried by the bicycle, and therefore it is not absolutely necessary that the clamp 7 be so constructed that the support can be removed and replaced; but it is preferable to so construct the clamp. The rod or stem section 3 is also preferably tubular, and at its lower end it is provided with a gear-supporting plate 8, in front of which is arranged a plate 9, rigidly connected with the plate 8 through the medium of rivets, bolts, or other suitable fastening devices 10. The two plates 8 and 9 are held at such a distance apart as to accommodate between them the two intermeshing gear-wheels 12 and 13, which are rigidly secured to laterally-extending journals or spindles 14 and 15 at the inner ends of two leg-pieces 16 and 17. The journals or spindles are adapted to rotate in suitable bearings or orifices in the plates 8 and 9 in such manner that if one of the leg-pieces be oscillated or turned the gear-wheel connected with its journal or spindle will also be turned, and thereby transmit motion to the other gear-wheel and move the other leg-piece in the arc of a circle. By this means the movement of either leg-piece is transmitted to the other leg-piece, and both leg-pieces are susceptible of oscillating or turning in a vertical plane parallel with the main rod or stem in such manner that both leg-pieces can be turned to an upright position beside the rod or stem or turned to a pendulous position, so that the foot-pieces 18 and 19 on the outer ends of the leg-pieces can rest on the floor or ground, and thereby support the bicycle in an upright position. The foot-pieces 18 and 19 are pivoted to the outer ends of the leg-pieces, so that such foot-pieces will accommodate themselves to the floor, ground, or surface against which they may come in contact. This is desirable where the floor or ground is not level, as obviously the foot-pieces can turn on their pivotal attachments and accommodate themselves to any unevenness.

The construction of the main rod or stem sections 2 and 3 of tubular form is desirable, in that such tubular form materially reduces the weight of the improved support.

The plate 9, which lies in front of the gear-wheels 12 and 13, is constructed with a row or series of locking-orifices 20, arranged in the arc of a circle and concentric with the journal or spindle at the upper end of the leg-piece 17. The leg-piece 17 is provided with a finger-lever 21, acted on at one end by a spring 22, and provided at its other end with a locking-pin 23, passing through a perforation in the leg-piece 17, and adapted to enter into engagement with any one of the locking-orifices 20. The spring 22 so acts upon the finger-lever that the locking-pin 23 is normally pressed inward to engage any one of the locking-orifices 20; but pressure can be readily applied to the spring-pressed end of the finger-lever for the purpose of disengaging the locking-pin from an orifice in the plate 9 for the purpose of permitting the leg-piece 17 to be rotated or turned in a vertical plane, thereby correspondingly turning the other leg-piece and enabling both leg-pieces to be either placed in an upright position beside the main rod or stem of the support or in a pendulous position, as in Fig. 1, so that the foot-pieces can rest upon the floor or ground for supporting the bicycle in an upright position. The two leg-pieces can be locked when they are turned to an upright position beside the main rod or stem through the medium of the locking-pin 23 of the finger-lever 21 engaging one of the locking-orifices 20 in the plate 9, or the two levers can be locked in a pendulous position, as in Fig. 1, in a similar manner.

The lengthwise extensibility of the main rod or stem, which is obtained by making the sections 2 and 3 telescopic, renders it possible to lengthen or shorten the support as a whole, and thereby readily adapt it to a bicycle of any height or size. The main rod or stem ordinarily hangs perpendicular or approximately perpendicular from the bicycle-frame 1, and consequently the leg-pieces are adapted to oscillate or turn in a vertical plane parallel with the plane of the main rod or stem. As before stated, movement of one of the leg-pieces is transmitted to the other leg-piece, and when one leg-piece is turned into an upright position beside the main rod or stem the other leg-piece is compelled to assume a like position, after which the parts can be locked by the finger-lever, and the two leg-pieces will thus be effectually held out of the way while the bicycle is being used.

If the clamp which attaches the improved support to the bicycle-frame is constructed to permit the support to be removed and replaced at will, the support can be readily removed and the two leg-pieces swung into a position beside the main rod or stem for the purpose of folding the same for convenient transportation or packing or storing away.

Having thus described my invention, what I claim is—

1. The combination of a main rod or stem having means at its upper end to engage a part of a bicycle frame, and a gear-supporting plate at its lower end, a pair of intermeshing, rotatable gears arranged vertically on the said gear-supporting plate, a pair of leg-pieces having journals or spindles at their inner ends secured respectively to the gears and adapted to oscillate in a vertical plane approximately parallel with the rod or stem and to turn from a pendulous to an upright position beside the rod or stem, a finger-lever mounted on one of the leg pieces and having a locking-pin, and a plate having orifices to receive the locking-pin for locking the leg-pieces when turned up or down, substantially as described.

2. The combination of a lengthwise extensible and retractible rod or stem, having a clamp at its upper end to engage a part of a bicycle frame, and a gear-supporting plate at its lower end portion, a plate arranged beside the gear-supporting plate and having locking orifices, a pair of intermeshing rotatable gears arranged between said plates, a pair of leg pieces rigidly connected to said gears and adapted to move in a vertical plane from a pendulous to an upright position beside the extensible and retractible rod or stem, and a locking lever carried by one of the leg pieces and adapted to engage one of said orifices, substantially as described.

3. The combination of an extensible and retractible rod or stem having a clamp at its upper end to engage a part of a bicycle, and a gear-supporting plate at its lower end, a pair of intermeshing, rotatable gears arranged on said gear-supporting plate, a plate arranged over said gears and having a series of locking orifices, a pair of leg pieces having journals or spindles mounted in said plates and secured respectively to the gears so that said leg pieces can oscillate in a vertical plane approximately parallel with the rod or stem and turn from a pendulous to an upright position beside the rod or stem, and a finger-lever mounted on one of the leg pieces and having a locking-pin to engage any one of the said orifices, substantially as described.

In testimony whereof I have hereunto set my hand in presence of two subscribing witnesses.

WALTER T. FRENCH.

Witnesses:
 ARTHUR J. SMITH,
 B. P. PELLETT.